United States Patent [19]
Kruger et al.

[11] 4,294,228
[45] Oct. 13, 1981

[54] SOLAR HEATING AND SUBTERRANEAN COOLING

[76] Inventors: Robert Kruger, 412 N. Burnt Mill Rd., Ashland, N.J. 08003; William J. Miller, Chalet Apartments, Tusc.-A, Pine Hill, N.J. 08021

[21] Appl. No.: 959,123

[22] Filed: Nov. 9, 1978

[51] Int. Cl.³ .................... F24J 3/02; F24H 9/08; E04B 1/74
[52] U.S. Cl. .................... 126/430; 126/431; 126/436; 126/437
[58] Field of Search .............. 126/417, 419, 428, 430, 126/431, 432, 434, 436, 438, 437, 449, 450, 48 N

[56] References Cited

U.S. PATENT DOCUMENTS

| | | | |
|---|---|---|---|
| 2,484,127 | 10/1949 | Stelzer | 126/419 |
| 2,931,578 | 4/1960 | Thompson | 126/429 |
| 2,982,054 | 5/1961 | Anderson | 52/82 |
| 3,236,294 | 2/1966 | Thomason | 165/48 R |
| 3,875,925 | 4/1975 | Johnson | 126/449 |
| 3,953,949 | 5/1976 | O'Sheeran | 52/82 |
| 3,973,812 | 8/1976 | Paltorak | 52/82 |
| 4,006,856 | 2/1977 | Nilsson | 126/431 |
| 4,069,809 | 1/1978 | Strand | 126/431 |
| 4,088,117 | 5/1978 | Keyes | 126/449 |
| 4,127,103 | 11/1978 | Klank | 128/428 |
| 4,135,491 | 1/1979 | Koizumi | 126/448 |
| 4,149,525 | 4/1979 | Riado | 126/450 |
| 4,184,481 | 1/1980 | Tornquist | 126/450 |

FOREIGN PATENT DOCUMENTS 2709552  3/1977  Fed. Rep. of Germany .......... 52/82

Primary Examiner—Herbert F. Ross

[57] ABSTRACT

A pyramidal-shaped living structure, having a triangular base plan, includes a pyramidal-shaped solar heating unit which forms the apex of the living structure. The heating unit contains a heat conducting chamber having a transparent wall. Solar rays enter the heat conducting chamber and impinge upon heat conducting elements disposed therein. The heat conducting elements absorb the heat energy in the solar rays causing the temperature of the elements to rise. The elements in turn heat air contained within the chamber. The heated air is then distributed to the interior of the living structure or to a subterranean heat exchange and storage unit, where the heat is extracted from the air and stored for use within the structure during those periods when there is not enough solar energy available to produce the heat required in the living areas.

24 Claims, 7 Drawing Figures

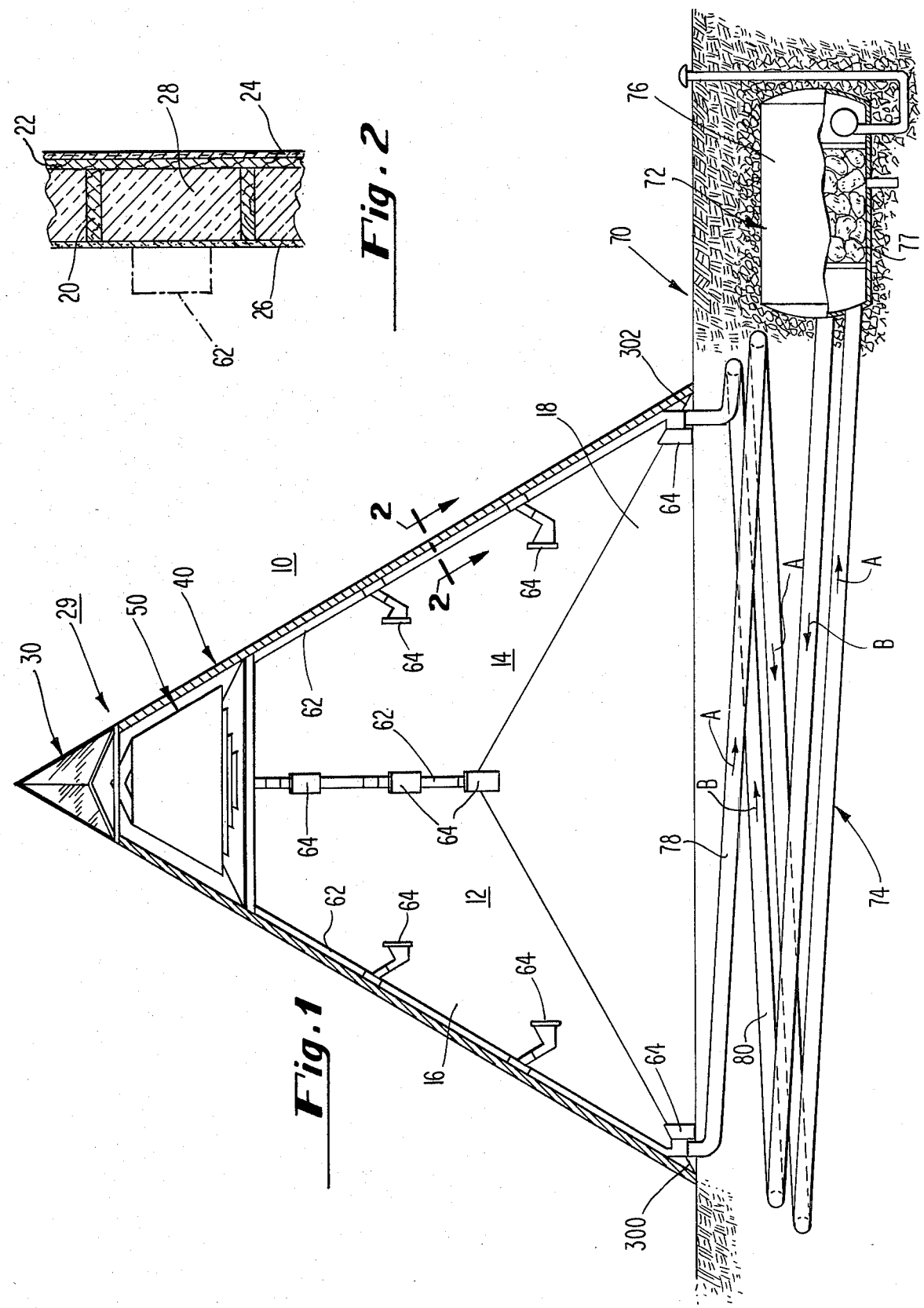

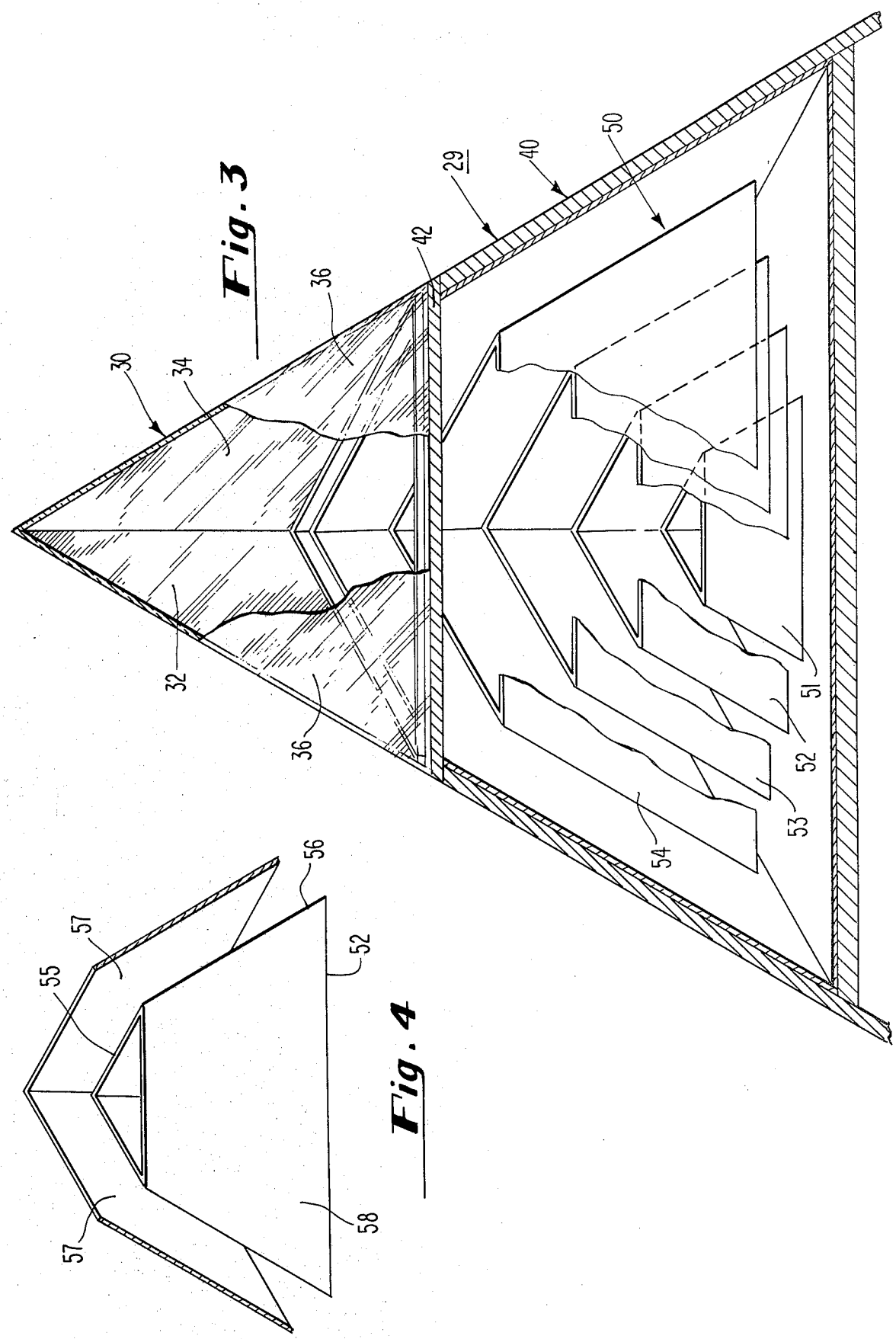

SOLAR HEATING AND SUBTERRANEAN COOLING

BACKGROUND OF THE INVENTION

This invention relates to a solar heating apparatus and in particular to a system for heating an enclosed space within a structure such as a home.

With the advent of dwindling supplies of fossil fuels the search for alternate sources of energy has intensified. One obvious source of energy is the sun; but, the technology involved in converting solar energy to more useable forms such as electricity, etc., has hindered the development of this source. However, in one area, such as the heating of enclosed space as in a home or other structure, the use of solar energy is more practical.

Methods using solar panels covering large portions of the roof of conventionally styled homes have received wide publication. One such panel comprises a winding of copper tubing having a heat exchange fluid running therethrough. The panel may also include various type surfaces behind the copper tubing such as a reflective surface so that as the sun impinges on the panel that portion of the solar rays which does not directly impinge on the copper tubing will be reflected from the reflecting surface in the back to heat the tubing. The fluid such as water within the tubing then is brought to a high temperature and this hot water can be used in conventional radiators, etc., to produce heat in the enclosed space elsewhere.

The problem with an approach such as that above is that the copper tubing becomes expensive and the logistics of keeping the water flowing through the tubing on the roof or in other areas becomes complex. In addition, heat exchange equipment such as radiators are needed in order to release the heat absorbed by the fluid into the enclosed space.

SUMMARY OF THE INVENTION

Applicant has invented a solar heating system which is highly practical and very efficient. In the preferred embodiment, solar rays are allowed to pass through a transparent portion into a chamber of a solar heating unit, which chamber serves as a heat generation means for generating heat from the impinging rays. The chamber includes heat conducting walls at least on the interior surfaces thereof. Contained within the chamber is a plurality of heat conducting elements which are adapted to receive the rays of the sun entering the chamber which rays then impinge upon a maximum heat conducting surface area namely the walls of the chamber and the numerous walls of the heat conducting elements. As the solar rays impinge upon the heat conducting surfaces, the surfaces warm up and heat the surrounding air within the chamber. A heated air distribution means associated with the chamber is then utilized for removing the heated air from the chamber and distributing it to the remainder of the structure or elsewhere where heated air is desired.

In one embodiment of applicant's solar heating system, the structure and solar heating unit are both pyramidal in shape with the transparent portion of the solar heating unit forming the apex of the structure. In addition, the heat conducting elements comprise a plurality of boxes disposed in a nested arrangement, each of the boxes having a triangular cross-section and trapezoidal shaped sides. In an alternate embodiment, the transparent portion is triangular in shape and forms one wall of a pyramidal-shaped solar heating unit which is disposed at the apex of the pyramidal structure. The other two walls of the solar heating unit, both of which are triangular in shape, are nontransparent. Each heat conducting element comprises a pair of triangular walls, disposed in abutting relationship with each other. The plane of each element wall is substantially parallel to the plane of a respective nontransparent wall. The heat conducting elements are disposed within the pyramidal-shaped solar heating unit in an array of increasing size, with the smallest element being disposed closest to the transparent wall.

In order to maximize the temperature to which the conducting surfaces will rise within the chamber, the surfaces in the preferred embodiment are painted green. In an alternate embodiment the color chosen is black. These colors are chosen to increase absorptivity.

The pyramidal shaped home of the preferred embodiment has several advantages. It provides more square footage of floor space per unit volume than conventional cubic or rectangular shaped homes. In the preferred embodiment, the pyramidal home is constructed of conventional materials, for example, the walls are of the frame-type construction. Because of the pyramidal shape, less lumber need be utilized in order to build the home than is required for a conventional home having comparable floor space per unit volume. The frame type construction wall has external siding along with sheet rock over a framed-out wall, the frame being made of lumber. The inside walls are made of wall board etc. over the same framing but on the opposite side from the sheet rock. The space in between is filled with insulation material to minimize heat losses. Alternatively, standard insulation filling the space could be replaced by sheets of mica less than a half an inch thick to provide very good insulation.

Applicant's solar heated pyramidal structure also includes a solar heated window for use in an inclined wall. The window comprises a first transparent sheet which is adapted to cover a window aperture in the inclined wall and a second transparent sheet which engages a portion of the incline for support and which is transverse to the first transparent sheet. In the preferred embodiment this second transparent sheet is substantially vertically oriented. The window further comprises a third member which engages an end of each of the transparent sheets to enclose the volume of window space. At least a portion of the third window member is covered with a conducting surface which is disposed to receive the solar radiation through the first transparent sheet. When this occurs, the heat conducting surface heats up and heats the enclosed space between the first second transparent sheets. This serves to insulate the interior of the space behind the inclined wall, thereby minimizing heat loss through the window. In the preferred embodiment the conducting surface may be made of corrugated metal as an example.

Applicant's invention also includes a subterranean heat exchange and storage system for use with the pyramidal home. The heat exchange system comprises a heat exchange and storage means which is buried in the ground and which exchanges heat with air which passes through it. In the preferred embodiment this heat exchange means comprises a tank which is filled with large stones as an example. The stones tend to stay at a constant temperature and once heated will heat the air around them, or when once cooled, will cool the air around them. Hence, in a time when more heat is being generated within the enclosed structure than is required, the heat can be transferred to the tank where it will heat up the stones for use at a later time. Then at night or on a cloudy day when heat required in the structure is not being generated by the heat generation means, air can be passed over the stones in the tank and heat given up by them to the air. The reverse process can be used in the summer, for example, and air from the enclosed space, which is now warm, can be sent to the tank past the stones which are cooled by virtue of the fact of being buried in the ground. As the warm air passes over the cold stones, heat is given up by the air to the stones and the air thereby cooled and piped back to the enclosed space.

As part of the subterranean heat exchange and storage system there is also air conducting means for conducting the air between the enclosed structure and the heat exchange means. The air conducting means comprises a first triangular winding of tubing which passes or links the structure to the heat exchange and storage means. There is also a second triangular winding for returning the air from the heat exchange and storage means to the structure. Both of the windings are beneath the triangular base of the pyramidal structure. As each length or side of the triangular winding slopes downward from the structure to the tank, it also increases in length and is directed outward from the center of the winding. As an example, the tubing can be made of plastic building tubing.

Also included in applicants' invention are means to distribute heated or cooled air between the heat generation chamber, the interior of the structure, the subterranean heat exchange and storage system, and a backup heater. In the preferred embodiment, the backup heater is used to provide heat during those times when there is not enough heat available from the heat generation chamber or the heat exchange and storage system to heat the interior portions of the structure to the desired temperature.

It is an object of the present invention to provide an efficient and simple solar heating system.

A further object of the present invention is to provide a subterranean heat exchange and storage system.

An additional object of the present invention is to provide means for distributing air between various components of the solar heating system, the subterranean heat exchange and storage system, and a utilizing structure.

Another object of the present invention is to provide a novel insulated window for use with inclined walls.

Another object of the present invention is to provide a new and more efficient solar heated structure.

This and other objects of my invention will become apparent from the following description with reference to the accompanying drawings.

BRIEF DESCRIPTION OF THE DRAWINGS

FIG. 1 is a schematic representation of a preferred embodiment solar heated structure of applicant's invention.

FIG. 2 is a greatly enlarged cross-section of a portion of the wall of the solar heated structure of FIG. 1 taken along the lines and arrows 2—2 in FIG. 1.

FIG. 3 is a greatly enlarged schematic representation of a portion of the solar heated structure of FIG. 1 showing a pyramidal transparent portion and an adjacent heat chamber portion of a solar heating unit containing a nest of heat conducting boxes.

FIG. 4 is a schematic view of a portion of the nest of boxes of FIG. 3.

DETAILED DESCRIPTION OF THE DRAWINGS

Figure 5:
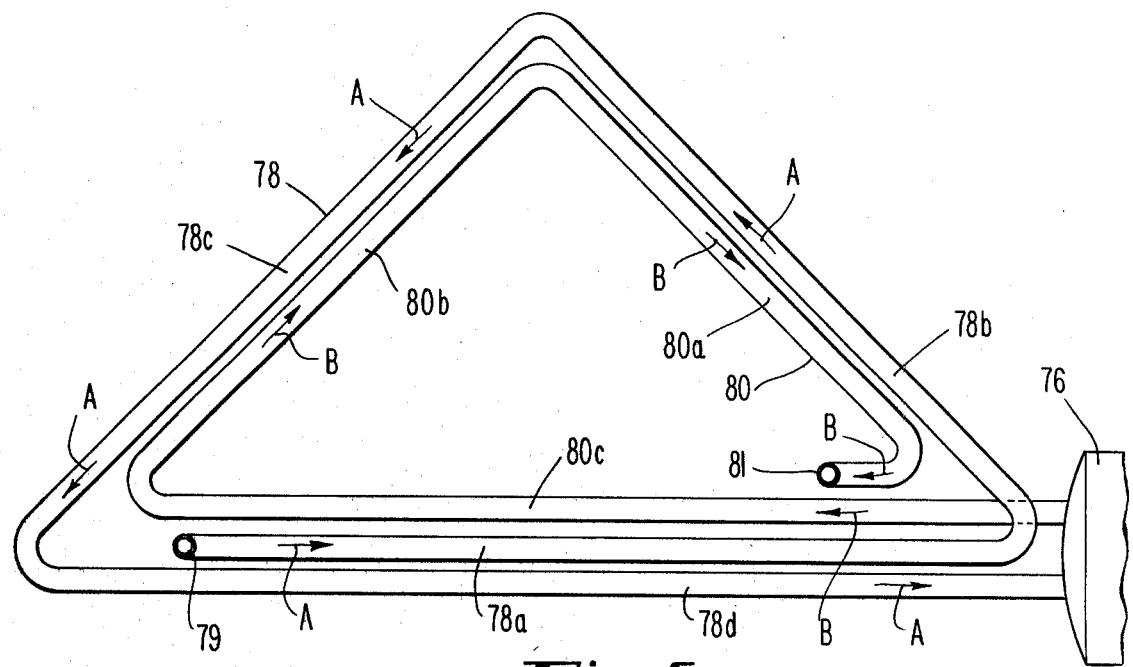
FIG. 5 is a top planar portion of triangular windings of tubing which link the solar heated structure of FIG. 1 with a subterranean tank.

Although specific forms of the invention have been selected for illustration in the drawings, and the following description is drawn in specific terms for the purpose of describing these forms of the invention, this description is not intended to limit the scope of the invention which is defined in the appended claims.

FIG. 1 illustrates a preferred embodiment pyramidal structure designated generally 10 having three inclined walls 12, 14, and 16. The walls 12, 14, and 16 as well as floor or base 18 all have equilateral triangular shapes in the preferred embodiment. A large portion of the walls of the structure are constructed with conventional construction techniques such as that shown in FIG. 2, for example, comprising wood framing 20, sheet rock 22 over the exterior side of the wood framing 20 and siding 24, such as asbestos shingle or aluminum, on the sheet rock 22. The interior surfaces of the wall are, in the preferred embodiment, made from indoor wall board 26 on the interior side of the framing 20. Insulation 28, for example fiberglas-type, is used to fill the space between sheet rock 22 and wall board 26. Alternatively, other insulation could be provided such as a thin sheet (less than 0.5 inches) of mica over the wood frame. Of course, other methods of construction could be used to construct the walls of the structure. For example, the wall could comprise, from the interior to the exterior respectively, thermosote refinished interior wall, 6 inches of fiberglass insulation, 1½ inch thermosote floor and roof decking, 3 inch thermosote nailbase roof insulation and exterior rough cut cedar shake siding.

A solar heating unit generaly designated 29, comprising a transparent portion 30 and a heat conducting chamber 40, is positioned at the top of the structure 10. The transparent portion 30 comprises transparent walls which, in one embodiment, are inclined equilateral triangles which serve as extensions of the remaining wall portions of the pyramidal structure and form the apex thereof. Conventional transparent material such as glass or plastic, for example, can be used. The heat conducting chamber 40 is located below and adjacent to the transparent portion 30. The heat conducing chamber 40 includes three inclined wall portions which are made in conventional manner as described above for the wood frame walls and which mate with the wall portions of the transparent portion 30 located above and the walls of the pyramidal structure below. In the preferred embodiment, each wall portion is trapezoidal in shape and the horizontal plane cross-section is an equilateral triangle in shape, the base being larger in area than the top which mates with the bottom of the transparent portion 30. The interior of the chamber 40 is lined with a heat conducting material, such as aluminum in the preferred embodiment.

A nest of heat conducting boxes designated generally 50 and preferably made from aluminum is shown within the heat conducting chamber 40. In one embodiment, each of the boxes is shaped similarly to the chamber itself and each box fits within the next larger box. As solar rays pass through the transparent portion, they enter the heat conducting chamber 40 and impinge on the chamber lining and the boxes 50 thereby heating them. The heated boxes 50 will then heat a fluid medium disposed within the heat conducting chamber 40. In the preferred embodiment, the fluid medium is air.

Heated air is removed from the chamber 40 by conventional air ducting means well known in the art. The heated air is ducted to a main blower system (not shown). By means of thermostatically controlled dampers (not shown), the main blower distributes the heated air to either the interior of the structure, by means of conventional warm air ducts 62 and warm air outlets 64 or to a subterranean heat exchange and storage means designated generally 72 by way of air conducting means designated generally 74. Normally, the heated air is ducted to the interior of the structure. When appropriately located thermostats within the structure indicate that the desired interior temperature has been reached, remotely operated dampers switch the ducting of the heated air from the interior structure to the heat exchange and storage means 72.

The heat exchange and storage means 72, referred to above, forms a part of a subterranean heat exchange and storage system designated generally 70 for use with the pyramidal structure 10. The heat exchange and storage means 72 is buried in the ground and exchanges heat with air which passes through the heat exchange means and the air conducting means 74. The heat exchange and storage means 72 comprises a tank 76 which is filled with large stones 77 or other heat storage means. Air is brought to the tank from the structure and returned there via ducting means which in the preferred embodiment is a pair of triangular windings of tubings 78 and 80. Winding 78 conveys air to the tank in the direction of arrows A, while winding 80 returns air to the structure in the direction of arrows B. FIG. 1 shows that the windings 78 and 80 slope downward from the structure to the tank. Air is moved through the tubing back and forth between the structure and the tank as well as through the tank and structure by the main blower system (not shown).

As previously stated, if more heat is generated by the heat chamber than is required, hot air can be diverted through the winding 78 to the tank 76 to heat the stones 77 and thereby store the heat. If at a later time sufficient heat is not being generated by the solar heating unit 29 due to cloudy skies or during the night, then the air from the home or structure 10 can be circulated over the stones 77, which were heated during the day, to remove heat therefrom and return the warmed air to the structure. If there is not enough heat stored in the heat exchange and storage means 72 and insufficient heat being generated by the solar heating unit 29 to heat the structure to the desired temperature, remotely operated switch and damper means will switch in an auxiliary heater (not shown) from which heated air will be ducted to the main blower system for distribution throughout the structure. Note that this auxiliary heater operates only if there is insufficient solar heat being generated or stored heat in the heat exchange and storage means 72.

In hot weather, warm air from the structure is sent through the winding 78 and over the stones 77, which are relatively cool by virture of their insulation underground, causing the air to give up its heat to the stones. The cooler air is then circulated back up the winding 80 into the structure where it cools the interior.

FIG. 3 is an enlarged illustration of the transparent portion 30 and heat conducting chamber 40 of the solar heating unit 29. The equilateral triangular sides 32, 34, and 36 are shown with side 36 shown partially broken away. The chamber 40 is shown supporting the transparent portion 30 by triangular base 42. The front trapezoidal wall of the heat conducting chamber 40 is shown removed in FIG. 3 to expose the nest of heat conducting boxes 50. Portions of one of the side walls of the boxes are shown broken away to expose the smallest internal box 51. Surrounding box 51 is box 52 which in turn is surrounded by box 53. Surrounding box 53 is box 54. In the preferred embodiment there are four boxes but more or less could be used depending on the size of the chamber.

Solar rays are free to pass through the transparent portion 30 and impinge on the internal walls of the heat conducting chamber 40 and the heat conducting side walls of the boxes 50. In the preferred embodiment, the interior surfaces of the chamber walls are highly reflective so that solar rays striking these sides are caused to reflect into the nest of boxes 50. The largest box of the nest, such as box 54 in FIG. 3, has the outside surfaces of its side walls covered with a black coating or a leaf-green coating such as a flat elm leaf-green. This causes the rays which impinge directly on these surfaces and which are reflected onto these surfaces from the polished side of the chamber walls to be absorbed thereby heating box 54. Similarly, the inside surfaces of the side walls of box 54 are highly reflective; and the outside walls of box 53, that is, the side wall surfaces of box 53 facing the inside side wall surfaces of box 54, are also covered with a black or green coating to make them highly absorbent. This process continues through the entire nest 50 so that a maximum amount of solar radiation passing through the transparent pyramidal portion 30 is brought in contact with absorbent side wall surfaces of the nest of boxes 50 within the chamber 40 to thereby capture the heat and pass it on to the air within chamber 40. Alternatively, the opposite side wall surfaces of the nest of boxes could be coated and polished respectively and the interior wall surfaces of the chamber could be absorbent with black or green coating.

FIG. 4 shows the truncated pyramidal appearance of a portion of the nest of boxes in greater detail, as for example, box 52 is shown with surrounding box 53 shown partially broken away. The triangular cross-section 55 and trapezoidal side wall 56 of box 52 is shown clearly in this figure as are the interior reflective surfaces 57 of box 53 and the absorbent surface 58 of side wall 56.

Figure 7:
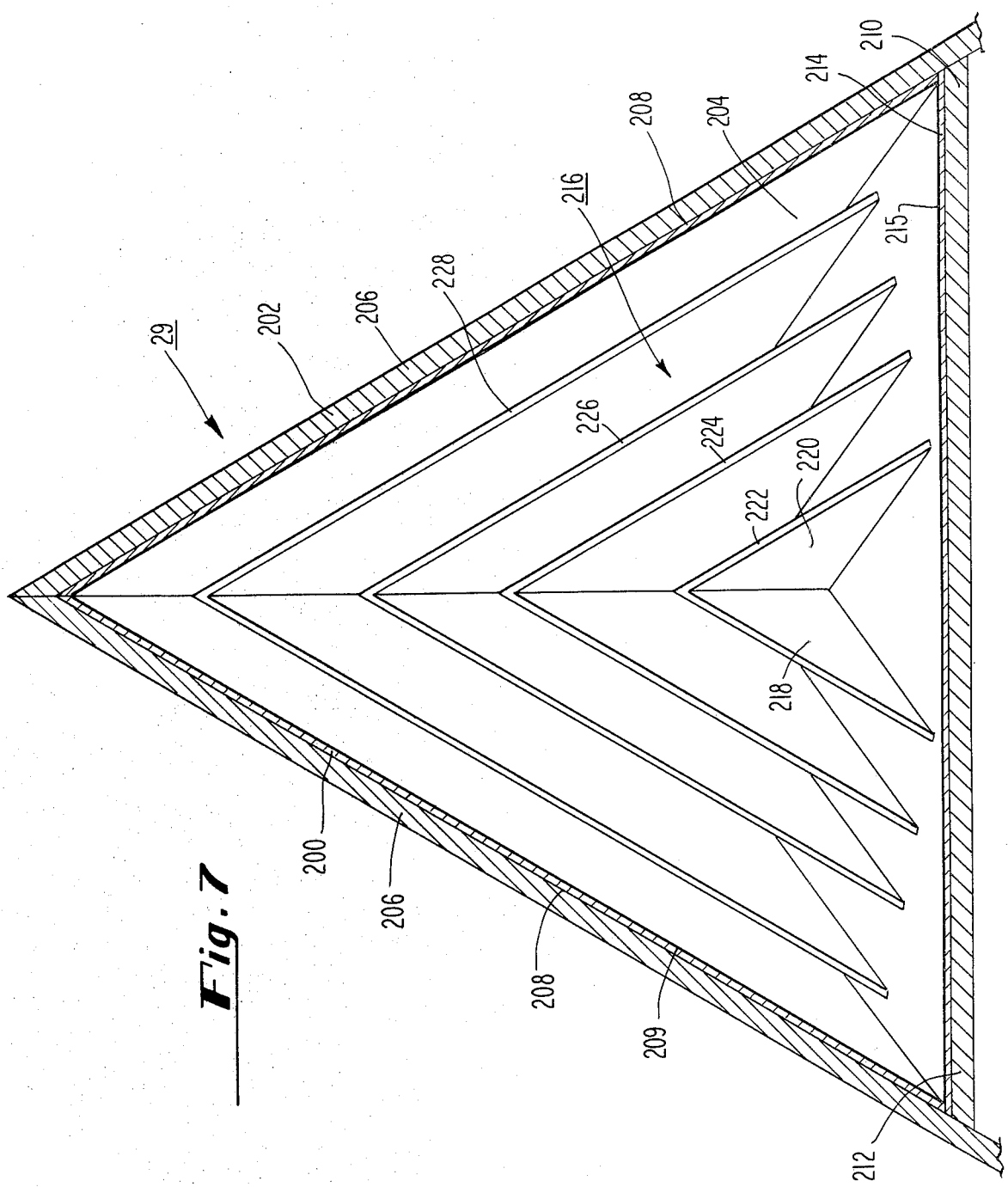
FIG. 7 is a greatly enlarged schematic representation of a portion of the solar heated structure FIG. 1 showing an alternate embodiment of the solar heating unit.

In FIG. 7 there is shown an alternate embodiment of the solar heating unit 29. As in the previously described embodiment, the solar heating unit 29 is generally pyramidal in shape comprising three walls, 200, 202, and 204, which are preferably inclined equilateral triangles and which serve as extensions of the remaining wall portions of the pyramidal structure and form the apex thereof. Two of the walls, 200 and 202, are nontransparent and are insulatingly constructed. Each of the walls 200 and 202 preferably comprise an outer earthen layer 206, for example concrete or thermocrete, with an insulating layer 208, for example a laminated mica sheet, disposed on the interior surface thereof. The mica sheet serves, in this embodiment, as an insulator and heat refractor. A layer of reflective material 209, such as polished aluminum, is disposed on the interior surface of the mica sheet. The third triangular wall 204 is formed of a transparent material, such as glass or plastic. The base of the solar heating unit 29 comprises a triangular insulating/reflecting floor 210 such as a concrete slab 212 having an insulating/heat refractive layer 214, for example a laminated mica sheet, disposed on the interior surface thereof. A layer of reflective material 215, such as polished aluminum, is disposed on the interior surface of the mica sheet.

An array of heat conducting elements, generally designated 216 is disposed within the pyramidal solar heating unit 29. Each heat conducting element comprises a pair of substantially planar triangular walls 218 and 220 adjoining each other. The plane of each element wall is substantially parallel to the plane of a respective nontransparent wall. For example, as shown in FIG. 7, element wall 218 is parallel to wall 200 and element wall 220 is parallel to wall 202. The heat conducting elements 216 are disposed in an array of increasing size, with the smallest element 222 being disposed closest to the transparent wall 204 and the largest element 228 being disposed closest to the nontransparent walls 200 and 202. In the embodiment illustrated in FIG. 7, there is shown an array of four elements 222, 224, 226, and 228. This array can comprise more or less elements depending on the interior volume of the solar heating unit 29. The walls of the heat conducting elements 216 are preferably made of aluminum, with the surfaces facing away from the transparent wall 204 being polished to form good reflectors. The surfaces facing the transparent wall 204 have disposed thereon a heat absorbing layer such as a black or flat elm leaf green coating.

In FIG. 1, the solar heating unit 29 is shown positioned at the top of the structure 10. It is to be noted however, that due to the novel pyramidal shape of both the solar heating unit 29 and the structure 10, one or more additional solar heating units 29 could be positioned at the corners of the pyramidal structure 10 to increase the heating capacity. For example, in addition to the solar heating unit 29 shown in FIG. 1, two more units could be included, one being positioned at the corner designated by reference numeral 300 and the other positioned at the corner designated by reference numeral 302. When using the alternate embodiment of the solar heating unit 29, the transparent wall 204 of each would all face the same direction and would be coplanar, for example, with the wall 16 of the structure 10 as depicted in FIG. 1. Consequently a pyramidal structure having solar units disposed at one or more of the corners thereof is deemed to be within the scope of the present invention.

FIG. 5 is a top plan view of the pair of triangular windings 78 and 80 connected to tank 76. The triangular nature of the windings is clearly shown. In the preferred embodiment the windings are situated below the triangular base of the structure 10 (see FIG. 1). As the windings get closer to the tank 76, the legs 78a, 78b, 78c, and 78d of the winding 78, become longer causing the triangle to increase in size. Similarly, as legs 80a, 80b, and 80c of winding 80 approach the tank 76, they increase in length. For example, leg 80c is greater in length than leg 80b which in turn is longer than leg 80a. Similarly, leg 78d of winding 78 is the longest while leg 78a is the shortest. In the preferred embodiment, winding 80 is located within winding 78 except for leg 78a which crosses over leg 80c. The windings are in fluid communication with the interior of structure 10 through the main blower system (not shown).

Figure 6:
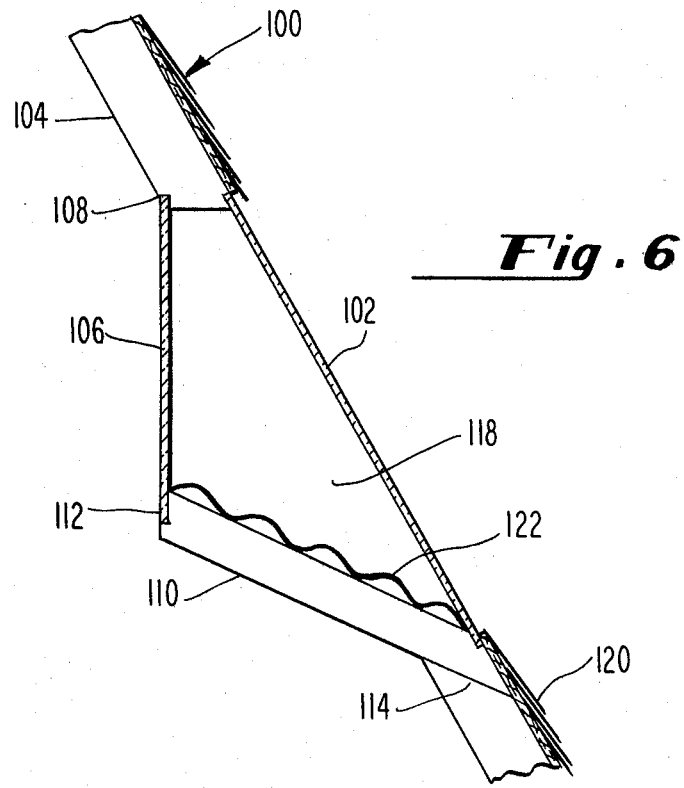
FIG. 6 is a side cross-section of a preferred embodiment solar heated window of applicant's invention.

FIG. 6 illustrates a cross-section of a preferred embodiment solar heated window designated generally 100 for use in a structure such as the pyramidal structure 10 of applicant's invention. However, the window 100 could be used in any inclined wall of a structure or home. The solar heated window 100 comprises a first transparent sheet 102 which is adapted to cover a window aperture in an inclined wall 104. A second transparent sheet 106 is spaced apart from transparent sheet 102 and is transverse thereto. In the preferred embodiment of FIG. 6 the top end of transparent sheet 106 engages inclined wall 104 at point 108. The window further comprises a third window member 110 which member engages the opposite or bottom end of transparent sheet 106 at region 112. Member 110 also engages wall 104 in region 114. Together, the wall 104, transparent sheets 102 and 106, and third window member 110 enclose a window area designated generally 118 in FIG. 6. The wall 104 is shown with shingle coverings 120, however any suitable external covering, such as aluminum siding, is acceptable. Third window member 110 has at least a portion of its surface covered with a heat absorbant material such as a black or green coated lining. In FIG. 6 this lining is shown as a corrugated metal lining 122. The solar rays pass through first transparent sheet 102 impinge upon the absorbant coating of the lining 122 to thereby heat up the lining 122. As this takes place, the air enclosed within enclosure or region 118 heats up and provides a thermal barrier against the loss of heat from within the structure 10. Light is still free to pass through transparent sheet 102 and 106 into the room. In the preferred embodiment, sheet 106 is substantially vertically oriented.

The following example is used to illustrate the function of the solar heating system of the present invention. With a pyramidal-shaped solar heating unit 29 having a volume of 900 cubic feet, disposed at the apex of a pyramidal structure having a volume of 11,939 cubic feet, the main blower system includes a blower having a capacity of 900 cubic feet per minute (CFM). With this capacity, the blower system changes the air in the solar heating unit 29 once every minute.

The walls of this exemplary structure are constructed as follows. The interior surface comprises a thermosote refinished interior wall having an insulation R value of 1. Six (6) inches of fiber-glass insulation, having an R value of approximately 30, is disposed between the interior wall and a layer of 1½ inch thermosote floor and roof decking, having an R value of approximately 7. A 3 inch layer of thermosote nailbase roof insulation, having an R value of approximately 21, is disposed between the decking and a suitable exterior, for example, exterior rough cut cedar shake siding. Consequently, the total R value of the walls is approximately equal to 59.

The base of this structure is constructed, for example, as follows. A porous fill substrate is covered by a 2 inch layer of rigid styrofoam sheathing having an R value of approximately 16. The sheathing is covered by a 4 inch concrete slab. The slab is covered, for example, by thermosote carpet underlayment and decking having an R value of approximately 7. Consequently, the total R value of the base is approximately equal to 23.

On a bright, sunny day, assuming the ambient temperature outside the structure to be 30° F., the heat conducting elements will be heated to a temperature of approximately 250° F. causing the air within the solar heating unit to rise to a temperture of approximately 180° F. after approximately 10 or 15 minutes. Thereafter, it will take approximately 13 complete changes of air by the blower to raise the interior temperature 14° F., or from 50° F. to 64° F. Thus, since approximately one minute is required per air change, it would take about 30 minutes to raise the interior temperature from 50° F. to 80° F. on a sunny day.

On a day when the conditions are only moderately sunny, the heat conducting elements are heated to a temperature of approximately 175° F. causing the air within the solar heating unit to rise to a temperature of about 120° F. Under these conditions, 13 complete changes of air within the solar heating unit would raise the temperature within the structure about 9° F. or from 50° F. to 59° F. Thus, it would take approximately 50 minutes to raise the interior temperature from 50° F. to 80° F.

On a hazy or partly cloudy day, in which the sun is filtered through the clouds periodically, the heat conducting elements are heated to a temperature of approximately 100° F. causing the air within the solar heating unit to rise to a temperature of about 72° F. Under these circumstances, 13 complete changes of air within the solar heating unit would raise the temperature within the structure about 5° F. or from 50° F. to 55° F. Thus, it would take approximately 90 minutes to raise the interior temperature from 50° F. to about 72° F. It should be noted that the minimum interior temperature is maintained at 50° F. due to the subterranean heat exchange and storage system.

It will be understood that various changes in the details, materials and arrangement of parts which have been herein described and illustrated in order to explain the nature within the principle and scope of the invention as expressed in the following claims.

What is claimed is:

1. A solar heating system for a structure comprising: at least one transparent portion; at least one heat conducting chamber for heating a fluid medium contained within said chamber by means of solar energy admitted to said chamber through said transparent portion, said heat conducting chamber further comprising a plurality of heat conducting elements disposed within said chamber; and a fluid medium distribution means associated with said chamber for receiving the heated fluid from said chamber and distributing it to utilization areas, said structure and said transparent portion are both pyramidal in shape, said transparent portion comprising at least one corner of said structure, said transparent portion comprises the apex portion of said structure, said plurality of heat conducting elements comprises a plurality of different size heat conducting boxes disposed in a nesting array, each box having at least three side walls.

2. The invention of claim 1 wherein each of said boxes comprise a triangular cross-section and trapezoidal side walls.

3. The invention of claim 2 wherein the interior walls of said chamber and the walls of said boxes are metal.

4. The invention of claim 3 wherein the interior walls of said chamber and the outwardly directed side wall surfaces of said boxes are reflective with respect to solar radiation while the inwardly directed side wall surfaces of said boxes are absorbent with respect to solar radiation.

5. The invention of claim 4 wherein the inwardly directed side wall surfaces of said boxes are black in color.

6. The invention of claim 4 wherein the inwardly directed side wall surfaces of said boxes are green in color.

7. The invention of claim 1 wherein said fluid medium is air.

8. The invention of claim 1 wherein the walls of said structure exclusive of said transparent portion include at least one layer of insulation.

9. The invention of claim 1 wherein said structure and said heat conducting chamber are both pyramidal in shape with said transparent portion forming one wall of said heat conducting chamber and said chamber forming at least one corner of said structure.

10. The invention of claim 9 wherein said chamber forms the apex of said structure.

11. The invention of claim 9 wherein said structure and said heat conducting chamber each have three walls and a triangular ground plan, with two of said chamber walls being nontransparent.

12. The invention of claim 11 wherein each of said heat conducting elements comprises a pair of substantially planar, triangular shaped walls disposed in abutting relationship to one another, each element wall having an outer surface facing toward and substantially parallel to an inner surface of a respective nontransparent heat conducting chamber wall, and an opposite inner surface facing generally toward said transparent wall.

13. The invention of claim 12 wherein said heat conducting elements are disposed in an array of increasing size, the smallest being disposed adjacent said transparent wall and the largest being disposed adjacent said nontransparent walls.

14. The invention of claim 13 wherein the inner surface of said nontransparent heat conducting chamber walls and the walls of said heat conducting elements are metal.

15. The invention of claim 14 wherein said metal is aluminum.

16. The invention of claim 14 wherein the inner surface of said nontransparent heat conducting chamber walls and the outer surface of each of said heat conducting element walls are reflective with respect to solar radiation and the inner surface of each of said element walls being absorbtive with respect to solar radiation.

17. The invention of claim 16 wherein said inner surface of each of said element walls has a black heat absorbing layer disposed therein.

18. The invention of claim 16 wherein said inner surface of each of said element walls has a flat elm leaf green heat absorbing layer disposed therein.

19. The invention of claim 16 wherein said fluid medium is air.

20. The invention of claim 19 wherein said fluid medium distribution means comprises a blower and control and ducting means for selectively distributing air between the heat conduction chamber, the interior of the structure, heat exchange and storage means and auxiliary heating means.

21. The invention of claim 20 wherein said control and ducting means comprises thermostatically controlled dampers disposed within ducts which provide fluid communication between said blower and said heat conducting chamber, said structure interior, said heat exchange and storage means and said auxiliary heating means.

22. The invention of claim 20 wherein said heat exchange and storage means comprises:
(a) a heat tank buried in the ground, said tank containing heat storage means for exchanging heat with air which passes therethrough; and
(b) air conducting means for conducting the air between said control and ducting means and said tank, said air conducting means comprising: a first triangular winding of tubing for conducting air from said control and ducting means to said tank means; and a second triangular winding of tubing for conducting air from said tank to said control and ducting means, both of said windings located beneath the triangular base of said structure.

23. The invention of claim 22 wherein said heat storage means comprises a plurality of stones.

24. The invention of claim 23 wherein said windings are sloped downward, the triangular sides of said windings increasing in length as said windings increase in depth.

* * * * *